(12) United States Patent
Ford et al.

(10) Patent No.: US 6,793,617 B2
(45) Date of Patent: Sep. 21, 2004

(54) PORTABLE AND DISPOSABLE EXAMINATION UNIT WITH AIR TUBE FRAME

(76) Inventors: Thomas E. Ford, 425 Parkwynne, Lancaster, PA (US) 17601; Michael T. Ford, 425 Parkwynne, Lancaster, PA (US) 17601; Douglas F. Ford, 425 Parkwynne, Lancaster, PA (US) 17601

( * ) Notice: Subject to any disclaimer, the term of this patent is extended or adjusted under 35 U.S.C. 154(b) by 0 days.

(21) Appl. No.: 10/364,389

(22) Filed: Feb. 12, 2003

(65) Prior Publication Data

US 2004/0158121 A1 Aug. 12, 2004

(51) Int. Cl.$^7$ ........................ A61G 10/02; A61G 11/00; A61F 13/00
(52) U.S. Cl. ............................. 600/21; 128/847; 312/1
(58) Field of Search ...................... 600/21, 101, 22; 128/849, 853, 917, 845–847; 312/1; 454/187, 188; 55/DIG. 29; 52/2.21, 2.11, 2.13, 2.18; 206/438; 348/77; 361/682; 135/117, 120.1, 91; 4/498; 607/104, 107; 165/46; 62/259.3

(56) References Cited

U.S. PATENT DOCUMENTS

| | | | |
|---|---|---|---|
| 2,786,740 A | 3/1957 | Taylor et al. | 23/259 |
| 2,972,353 A | 2/1961 | Ouest | 134/200 |
| 3,060,819 A | 10/1962 | Tohill | 95/1 |
| 3,354,922 A | 11/1967 | James | 146/215 |
| 3,818,896 A * | 6/1974 | Deaton | 600/22 |
| 3,875,927 A * | 4/1975 | Trexler | 600/21 |
| 4,000,749 A * | 1/1977 | Busco | 600/21 |
| 4,091,852 A | 5/1978 | Jordan et al. | 150/0.5 |
| 4,332,112 A * | 6/1982 | Hsu | 52/2.21 |
| 4,384,603 A | 5/1983 | Tyrer et al. | 150/0.5 |
| 4,858,755 A | 8/1989 | Kuivanen | 206/45.31 |
| 5,316,541 A * | 5/1994 | Fischer | 600/21 |
| 5,342,121 A | 8/1994 | Koria | 312/1 |
| 5,553,933 A | 9/1996 | Ross | 312/1 |
| 5,609,163 A * | 3/1997 | Beard | 128/846 |
| 5,632,769 A * | 5/1997 | Kappel et al. | 607/104 |
| 5,671,983 A | 9/1997 | Miller et al. | 313/1 |
| 5,785,396 A | 7/1998 | Israel | 312/1 |
| 5,824,161 A | 10/1998 | Atkinson | 134/6 |
| 5,987,822 A * | 11/1999 | McNiff et al. | 52/2.11 |
| 6,132,367 A * | 10/2000 | Adair | 600/101 |
| 6,418,932 B2 * | 7/2002 | Paschal et al. | 128/845 |

OTHER PUBLICATIONS

Gizmos & Gadgets, About Contact Products Class into Links, Pop–N–Links.
Detecto Print, John Olenik, Fingerprint Examiner, updated Jan. 24, 2002.
Portable Fuming Chamber, Lightning Powder Compay, Inc. The Original Safe MailBag.

* cited by examiner

Primary Examiner—Eric F. Winakur
Assistant Examiner—Nikita R. Veniaminov
(74) Attorney, Agent, or Firm—Jacobson Holman PLLC

(57) ABSTRACT

An examination unit having walls of substantially transparent plastic material coupled to an air tube frame that, when inflated, supports the walls to define an enclosed chamber. Access to the chamber is gained through a resealable port that facilitates easy entry and exit, as well as good sealing of the air within the chamber. Built into at least one wall of the chamber is a pair of sleeved-gloves that allow: a user of the examination unit to insert his or her hands into the chamber to handle an object therein without skin contact. The examination unit may be collapsed for space-saving storage and transport, and then readily inflated to provide a suitable environment for any number of treatments or investigations requiring that an object remain isolated from the user.

21 Claims, 6 Drawing Sheets

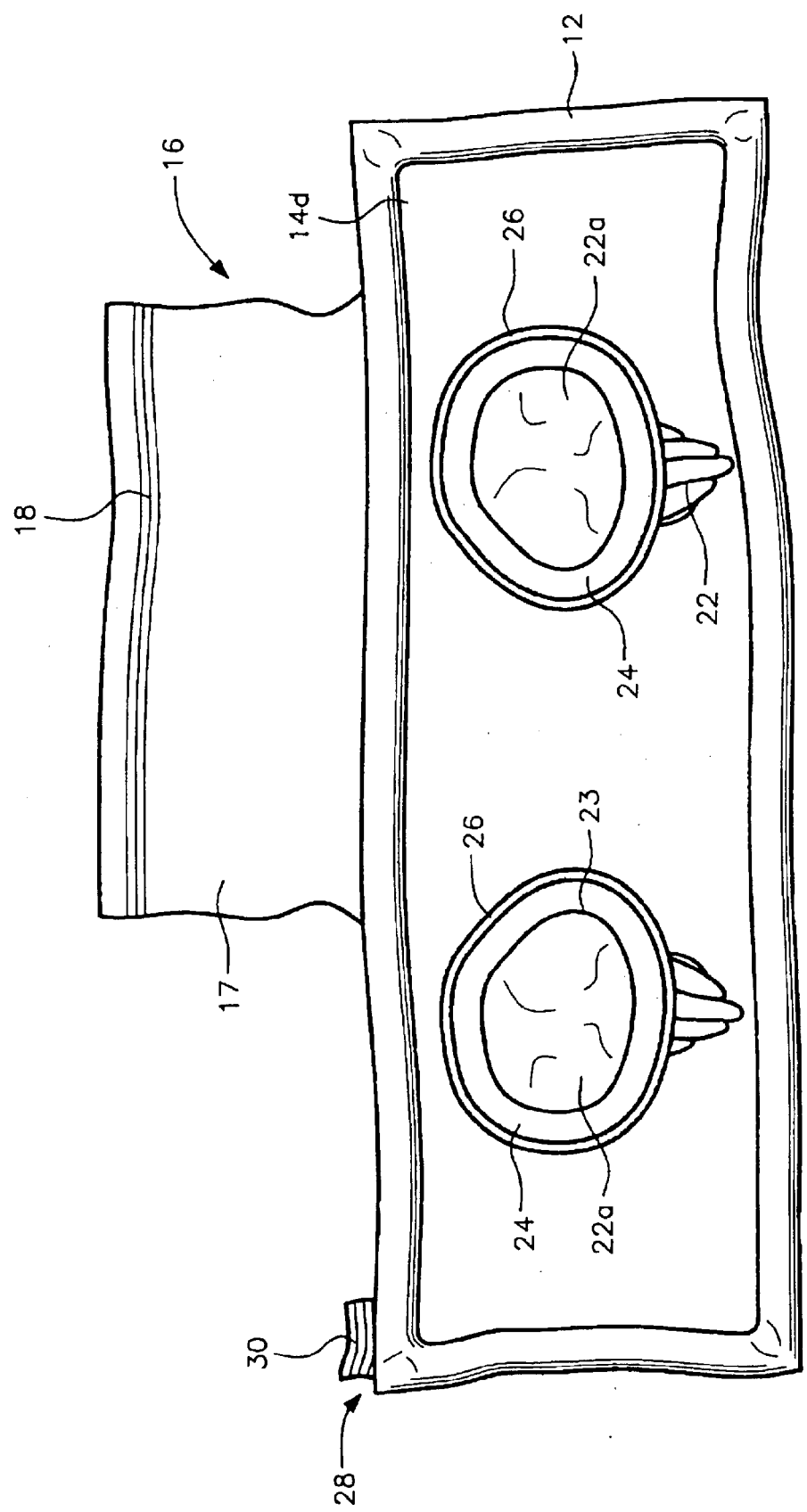

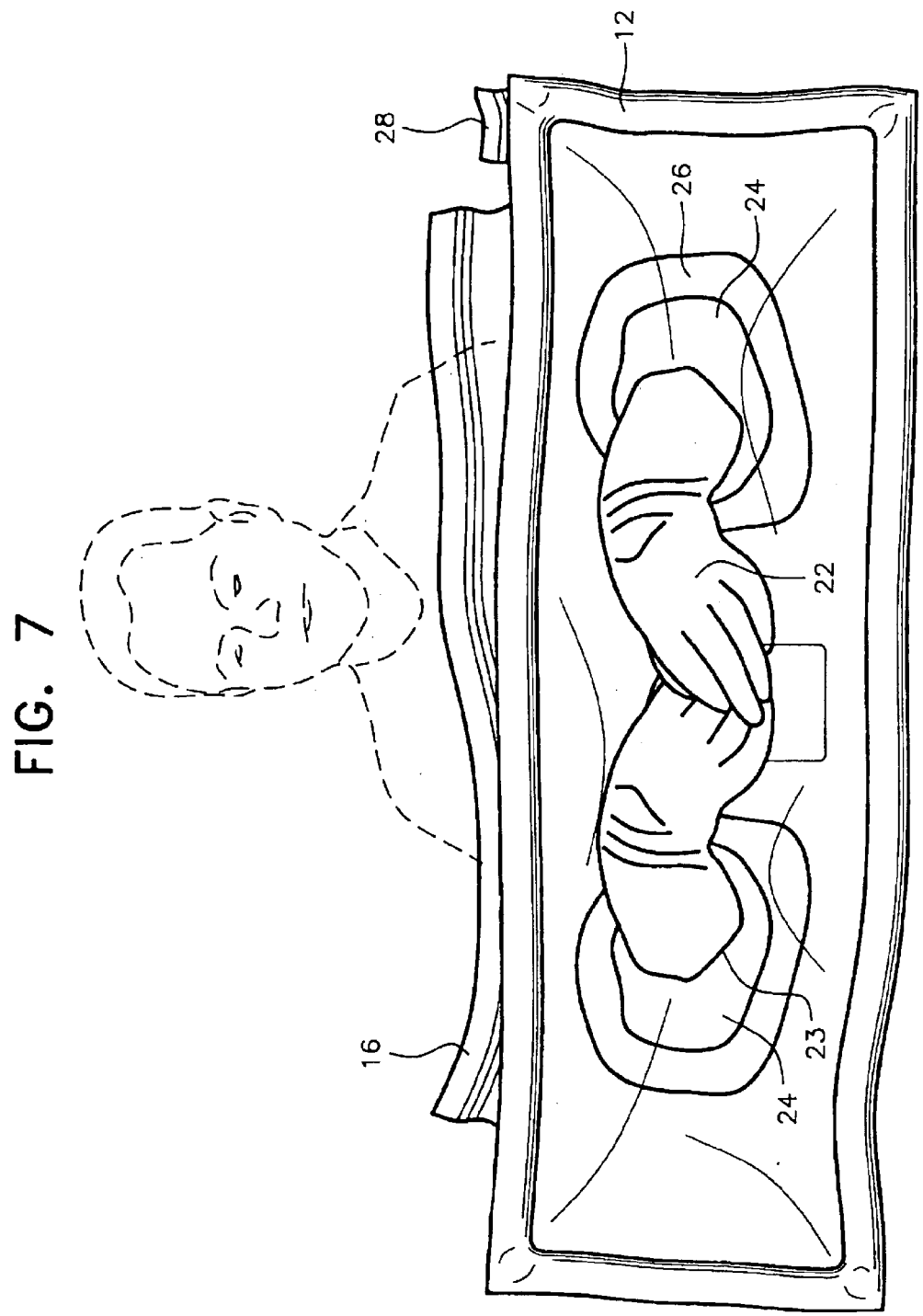

PORTABLE AND DISPOSABLE EXAMINATION UNIT WITH AIR TUBE FRAME

BACKGROUND OF THE INVENTION

1. Field of the Invention

The present invention is related to the field of fume containment sytems and, more particularly, to a highly portable and disposable fume and evidence bag.

2. Description of the Related Art

For many years, objects could be enclosed and sealed within a bag using various sealing devices so as to produce an airtight environment. Bags such as that taught in U.S. Pat. No. 5,671,983 to Miller et al. are able to house the object well, but lose their shape due to flimsy material and lack of a supporting structure to provide shape retention. In use, the overall bag takes on an undefined globular shape and, there being nothing to hold the bag away from the object contained therein, it is often difficult to conduct an effective investigation of materials within the bag.

Other prior art sealing chambers are provided with a frame to define an investigation area, such as that shown in U.S. Pat. No. 5,342,121 to Koria and U.S. Pat. No. 5,824,161 to Atkinson. But these devices are not easily transported and do not allow for cost-effective disposal after a single use.

There are no attributes built into present bags which allow one to handle and work with the contents of the bag as if the bag were not even there. With the ever-demanding need to isolate objects for investigation or to prevent contamination, and to do so inexpensively, a need exists for a portable and disposable unit defining a secure, virtually airtight environment for the investigation and study of objects therein.

SUMMARY OF THE INVENTION

In view of the foregoing, one object of the present invention is to overcome the difficulties of examining objects within a sealed-bag environment by providing an inflatable air tube frame that defines a three-dimensional investigation enclosure.

Another object of the present invention is to provide a readily collapsible and inflatable examination unit that can be easily transported and cost-effectively disposed of after a single use, while also having sufficient durability to be used repeatedly.

A further object of the present invention is to provide a three-dimensional enclosure having a readily reseal able access port that may be manually operated easily and quickly.

Yet a further object of the present invention is to provide an examination unit having built-in gloves to manipulate objects contained within the unit so that the user is not exposed to the objects contained in the unit while also not further contaminating the objects.

A still further object of the present invention is to provide a sealed examination unit that is not complex in structure and which can be manufactured at low cost but yet efficiently provide an isolated environment for object storage, transport and investigation.

In accordance with these and other objects, the present invention is directed to a disposable examination unit having walls of substantially transparent plastic material coupled to an air tube frame that, when inflated, defines a generally rectangular enclosed chamber. Access to the chamber is gained through a resealable port that facilitates easy entry and exit, as well as good sealing of the air within the chamber. Preferably built into at least one wall of the chamber is a pair of gloves that allow a user of the examination unit to insert his or her hands into the chamber to handle an object therein while being separated therefrom by the glove material. The examination unit is collapsible for space-saving storage and transport, and then readily inflated to provide a suitable closed environment for storage and transport and any number of treatments or investigations requiring that an object remain isolated from the user.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a cross-sectional view taken along line 3—3 of FIG. 1, substantially where the outer layer of the entry cuffs is sealed to the wall of the unit;

FIG. 7 is a rear view of the examination unit of FIG. 1, shown in use.

DETAILED DESCRIPTION OF THE PREFERRED EMBODIMENTS

Figure 1:
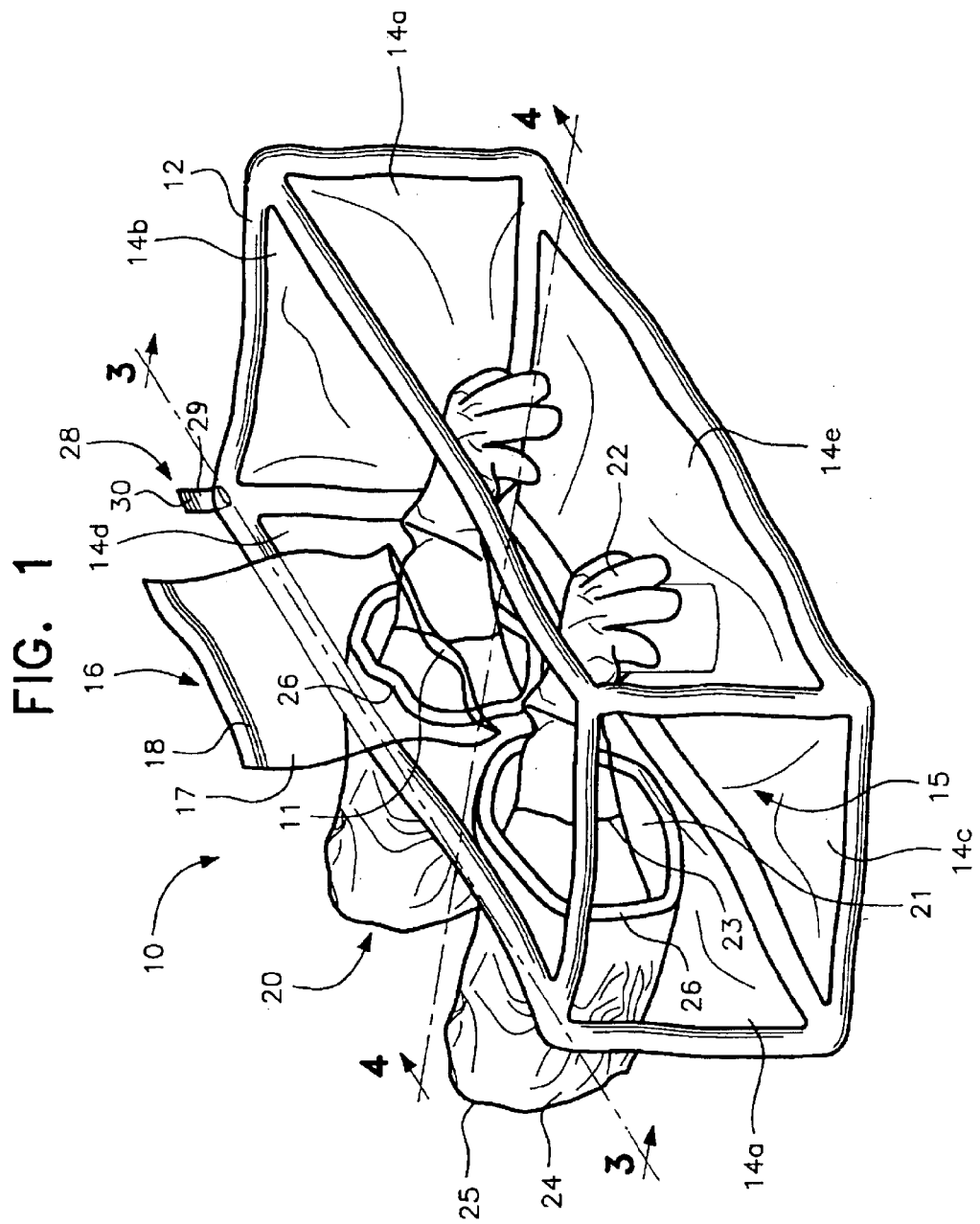
FIG. 1 is a perspective view of an examination unit inflated for use in accordance with the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIG. 1, the present invention is directed to an examination unit, generally designated by the reference numeral 10, having an inflatable air tube frame 12, a plurality of substantially transparent walls 14, and a resealable access port, generally designated by the reference numeral 16. The air tube frame 12 is inflated using an air input structure, generally designated by the reference numeral 28.

The air tube frame 12 is formed of a plurality of cylindrical tubes, all of which are connected together so that air introduced through the air input structure 28 flows freely to inflate all of the tubes at one time. When the tubes are fully inflated they pull the walls 14 into position, giving the unit a generally rectangular, box-like shape that can free-stand on a surface without additional support. In a preferred embodiment, the inflated air tubes have a diameter of approximately 1.25 inches.

The plurality of walls include two end walls 14*a*, a top wall 14*b*, a bottom wall 14*c*, a front wall 14*d*, and a rear wall 14*e*. For the purposes of this description, the wall facing the user of the examination unit is designated the front wall 14*d*, with the wall that is opposing and generally parallel thereto being the rear wall 14*e*. When the air tube frame 12 is inflated, the walls are supported and separated by the frame to define a chamber or chamber space, generally designated by the reference numeral 15. The top wall has an opening 11 therein to allow objects to be placed in the chamber 15.

In a preferred embodiment, the top wall 14*b*, bottom wall 14*c*, front wall 14*d* and rear wall 14*e* are each approximately 4 feet in length and 2 feet in width, with the end walls 14*a* being approximately 2 feet square. Walls of other dimensions may of course be used.

The air tubes of the frame 12 and the walls are preferably constructed of clear polyethylene plastic having a thickness of approximately 0.006 inches. Depending upon the particular need to be met and the durability required, the thickness of the plastic may range from approximately 0.004 inches to 0.12 inches. The walls and air tubes are formed and held together by heat seaming the edges and corners in accordance with well known equipment and practices in the plastic forming art.

The access port 16 through which objects may be placed within the walls is also preferably constructed of a plastic sheet 17, constructed so as to have a tubular shape or made of two sheets of plastic that are heat sealed along the side edges. The bottom edge of the tubular sheet 17 is open and sealingly connected to the top wall 14*b* so as to encircle the opening 11 therein. With this alignment of corresponding openings, the interior space of the tubular sheet of plastic 17 is in communication with the chamber space 15. The top of the sheet 17 is closed with a sealing mechanism 18. The sealing mechanism 18 may be embodied as a ZIPLOCK brand rib-and-channel type closure having male and female sealing members that are aligned and joined by pressing both members together while simultaneously sliding along the mating surfaces thereof. The access port 16 may be embodied using a bag of polyethylene plastic having a ZIPLOCK brand rib-and-channel type closure with the bottom of the bag opened for access therethrough to the underlying chamber space 15.

While only depicted as being connected to the top wall 14*b*, the access port 16 could alternatively be connected to any of the other walls. For example, the rear wall 14*e* or either of the end walls 14*a* could be provided with the access port. Furthermore, while shown having an opening length less than the overall length of the top wall 14*b*, in a preferred embodiment the access port 16 may have a length that extends up to the full length or width of whatever wall to which it is sealingly connected. In this way, large objects having a length nearly commensurate with that of the examination unit may be inserted therein without difficulty.

Sealingly connected to at least one of the walls of the examination unit 10 is a manual manipulation apparatus, generally designated by the reference numeral 20, which preferably includes a pair of sleeved-gloves 22 and corresponding entry cuffs 24. The sleeved-gloves 22 extend into the chamber space 15, preferably having a length that covers the lower arms and enables the user to access the full area of the chamber. In a preferred embodiment, the gloves may be commercially available waterproof kitchen-style gloves, and include a left-handed and a right-handed glove. Alternatively, a single glove could be employed.

The entry cuffs 24 are each preferably formed by a tubular piece of thin plastic material folded back upon itself to create two layers. The outer edge of the inner layer of the cuffs is circumferentially sealed to an edge 23 of the gloves distal from the fingertips, i.e., that portion which reaches furthest up the wearer's arms. The outer edge of the outer layer of the cuffs is circumferentially sealed to the edges of one of the two circular openings 21 in the front wall 14*d*, respectively, with seal 26 formed so that there are no air gaps between the manual manipulation apparatus 20 and the wall 14*d*. The cuffs 24 may be made of kitchen-style garbage bags or other thin plastic material.

While the embodiment shown in the drawing figures depicts the manual manipulation apparatus 20 connected by heat seaming with the front wall 14*d*, the apparatus 20 could alternatively to coupled to any of the other walls. For example, one glove and cuff could be sealed to each of the two end walls 14*a*, respectively.

In the preferred embodiment shown in FIG. 1, the air input structure 28 is a generally tubular piece of plastic sheeting 29 sealed with a ZIPLOCK brand rib-and-channel type closure seal 30. The sheeting 29 is heat sealed to form an air-tight connection around an opening in the frame 12 such that air passing through the tubular sheeting 29 enters the tubular members of the frame 12 for inflation thereof.

Figure 2:
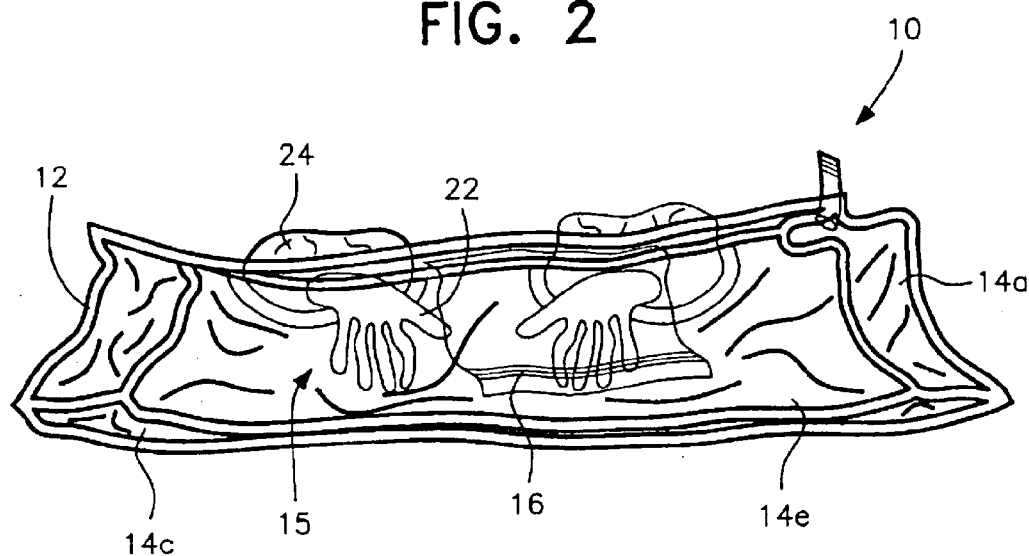
FIG. 2 is a rear view of the examination unit of FIG. 1, shown in a partially collapsed state.

FIG. 2 illustrates the examination unit in a partially deflated state. When air is expelled through the air input structure 28, the air tube frame 12 collapses, removing the support to the walls 14 such that the volume of the chamber space 15 is reduced or, if fully collapsed, virtually eliminated.

Figure 4:
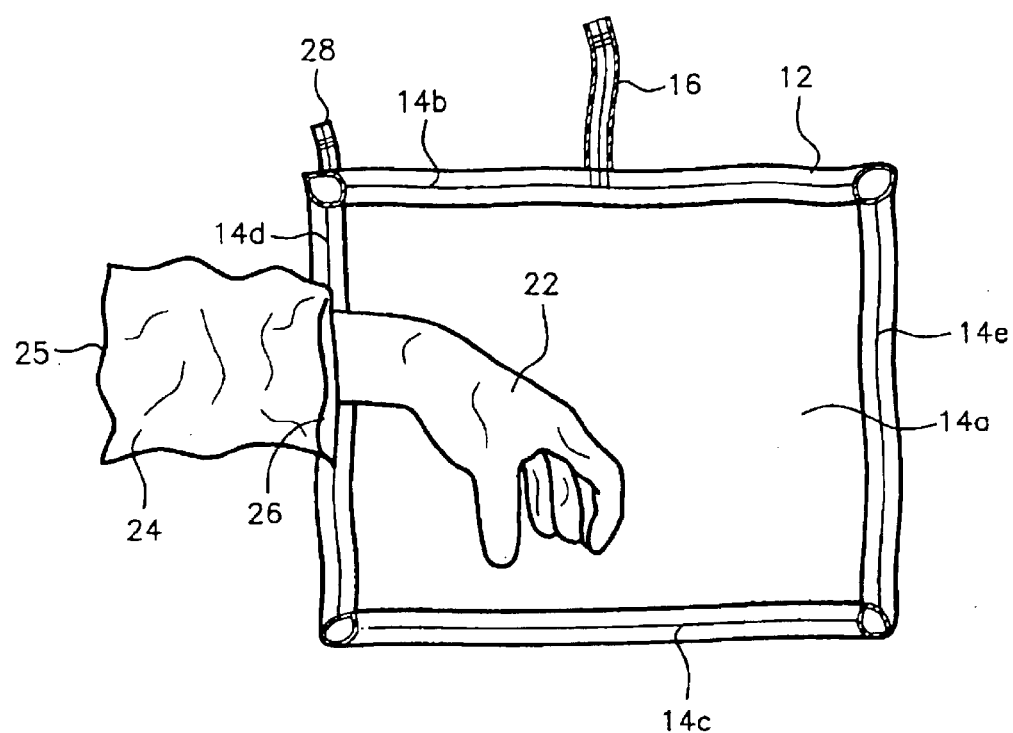
FIG. 4 is an cross-sectional view taken along line 4—4 of FIG. 1.

FIGS. 3 and 4 are cross-sectional views taken along lines 3—3 and 4—4 of FIG. 1, respectively, illustrating the seal 26 between the entry cuff 24 and the front wall 14*d*. The entry cuffs 24 extend outwardly from the front wall 14*d*, with the folded edge 25 nearest the wearer, and the central portion of the two-layered tubular cuff 24 is in communication with the interior 22*a* of the glove 22. Grasping the cuffs makes it easier for the wearer to insert his/her hands through the cuffs 24 and into the gloves 22, and the stress on the seal 26 due to working ones hands into the gloves is reduced. Because the cuff 24 is sealed against the front wall 14*d*, and the glove 22 is sealed to the cuff 24, the interior 22*a* of the glove is sealingly separated from the interior of the chamber 15 by the material from which the gloves 22 are made, which may be rubber or latex or any other suitable material. While separating the hands from the chamber, however, the gloves still provide good touch capability.

Figure 5A:
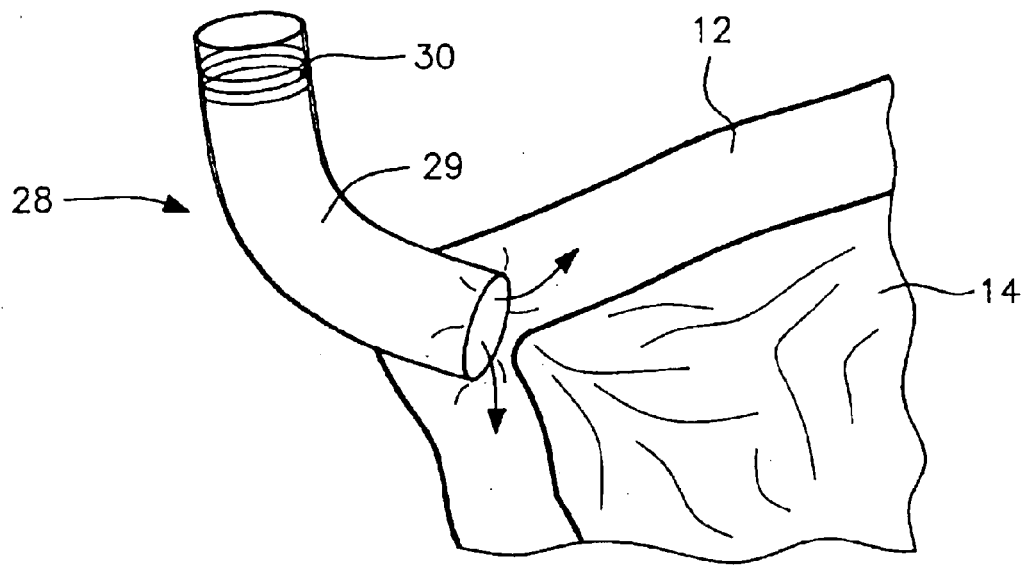
FIG. 5A is an enlarged fragmental view of a preferred air input structure for inflating the frame of the examination unit of FIG. 1.

FIG. 5A depicts the air inlet structure 28 according to a preferred embodiment, including tubular sheeting 29 and rib-and-channel closure seal 30. To inflate the frame 12, the seal 30 is opened and the user can input air either manually or using an air device. When the frame is sufficiently inflated, the seal 30 is closed. The examination unit 10 of the present invention works effectively to provide a spacious box-like interior chamber space 15 at a range of air pressures within the frame 12, such that some air loss during the process of closing seal 30 is not critical.

Figure 5B:
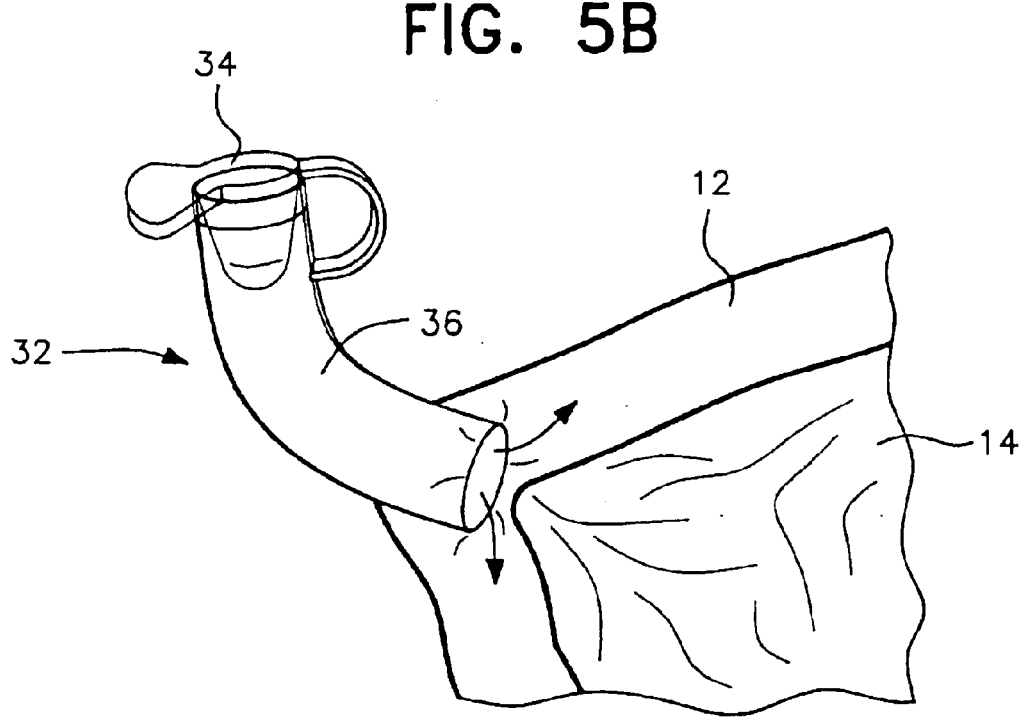
FIG. 5B is an enlarged fragmental view of an alternative air input structure for inflating the frame of the examination unit in accordance with the present invention.

An alternative air inlet structure, generally designated by the reference numeral 32, is illustrated in FIG. 5B. As shown, a generally tubular member 36 may be sealingly connected to the frame 12 in a manner similar to that of the sheeting 29 as just described. The tubular member 36 is sealed with a plug 34 like that commonly used with inflatable toys, air mattresses, and the like. This air inlet structure 32 facilitates higher inflation levels within the frame 12 which may be desired.

Figure 6:
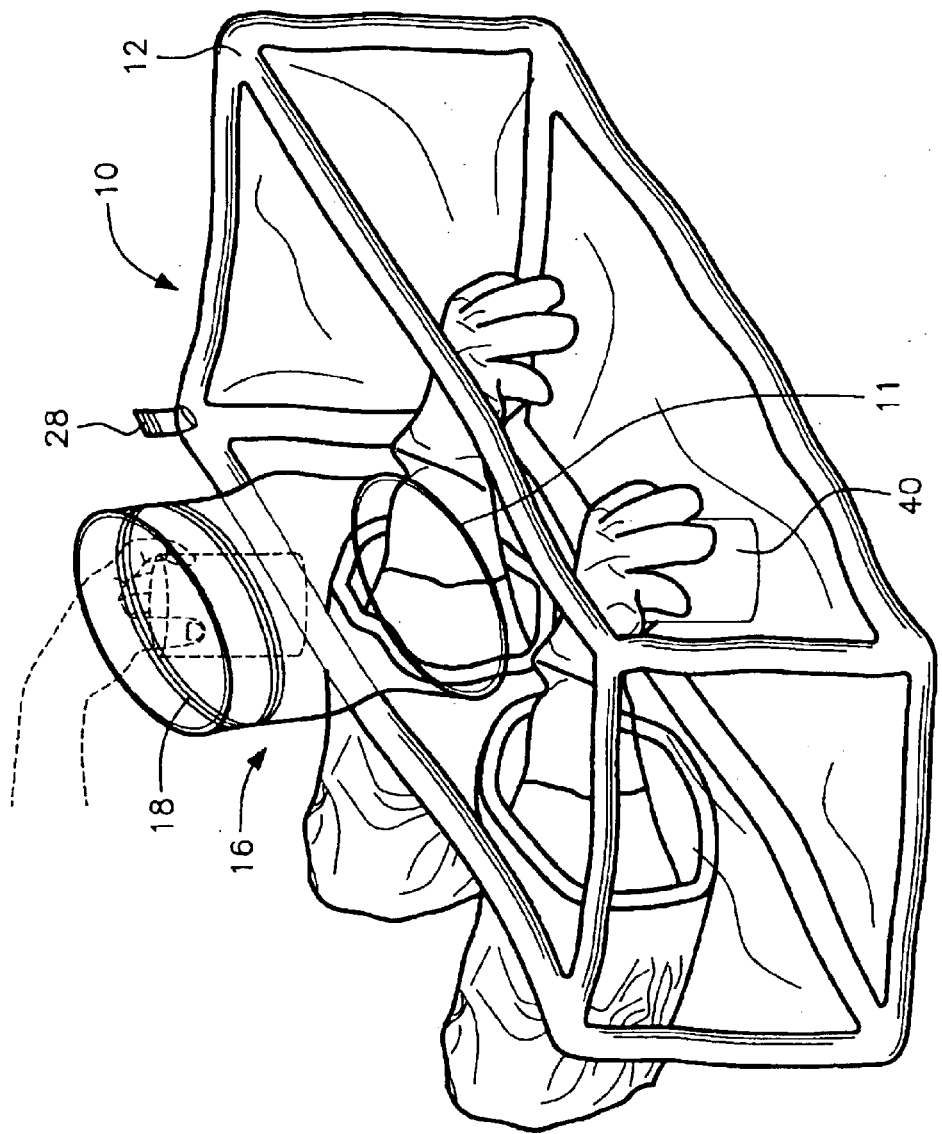
FIG. 6 is a perspective view of the examination unit of FIG. 1, showing the access port in the open position for placement of objects within the examination chamber.

FIG. 6 illustrates the process by which objects, such as can 40, may be placed within the chamber 15 through the access port 16; such insertion may occur after the frame 12 has been inflated using the air inlet structure 28 or 32, as shown, or may be undertaken before the frame is inflated. The seal 18 is opened, and the user inserts an object through the tubular channel formed by the sheet 17, through opening 11, to place the object on the bottom wall 14c. Once the object is in place, the seal 18 may be closed and, if not done already, the frame may be inflated. Then, by inserting the hands into the gloves 22 of the manual manipulation assembly 20, the user can safely handle and investigate the object, as representatively depicted in FIG. 7, without fear of chemicals, particles or other substances ever entering or exiting the examination unit 10.

While polyethylene is the preferred material for the frame 12, walls 14 and sheet 17, other polymer and plastic flexible film materials can be used. The film material is preferably transparent, but the air input structure 28 or 32 need not be transparent or flexible. The gloves 22 are preferably latex and the cuffs 24 preferably polyethylene, but neither need to be transparent. However, any polymer, plastic or elastomeric materials can be used for all of the components of the examination unit 10 which permit such unit to be collapsed and inflated through the frame, and which allow external observation of the objects placed in the chamber space 15.

The foregoing descriptions and drawings should be considered as illustrative only of the principles of the invention. The invention may be configured in a variety of shapes and sizes and is not limited by the dimensions of the preferred embodiment. For example, the air tube frame 12 could be configured to form a cylindrical or pyramid shape and so defining the chamber space 15. The manipulation apparatus 20 and access port 16 could then be appropriately positioned therein.

Further, numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A disposable examination unit comprising:
   an inflatable air tube frame formed of a plurality of generally cylindrical tubes;
   a plurality of walls sealingly connected to said air tube frame so that, when said frame is inflated, said plurality of walls define a generally rectangular enclosure surrounding and fully enclosing an interior chamber;
   a resealable access port for introducing an object into said chamber and removing an object from said chamber, sealing of said access port providing a closed environment in said chamber for object storage, transport and investigation; and
   a manual manipulation assembly built into at least one of said plurality of walls to enable a user to handle an object positioned in said chamber without skin contact therewith.

2. The examination unit as set forth in claim 1, wherein said walls include a bottom wall upon which an object is placed.

3. The examination unit as set forth in claim 2, wherein said walls and said frame are made of polyethylene plastic having a thickness of approximately 0.006 inches.

4. The examination unit as set forth in claim 1, wherein said plurality of generally cylindrical tubes are joined together so that air introduced through a single air input structure flows freely throughout said frame for inflation thereof.

5. The examination unit as set forth in claim 4, wherein said air input structure comprises a tubular sheet of polyethylene plastic heat sealed to said frame and including a sealing member to prevent escape of air input to said cylindrical tubes.

6. The examination unit as set forth in claim 5, wherein said sealing member is a rib-and-seal channel seal having male and female sealing members that are aligning and joined by pressing-both members together while simultaneously sliding along mating surfaces thereof.

7. The examination unit as set forth in claim 5, said sealing member is a plug.

8. The examination unit as set forth in claim 1, wherein said access port comprises a tubular sheet of polyethylene plastic heat sealed to one of said plurality of walls and aligned with a hole therein for accessing said chamber, said access port including a substantially air-tight closing mechanism for sealing said chamber.

9. The examination unit as set forth in claim 1, wherein said manual manipulation assembly includes a pair of gloves sealingly connected to at least one of said plurality of walls and extending into said chamber so that an interior of said gloves is isolated from said chamber.

10. A disposable examination unit comprising:
    an air tube frame formed of tubing which allows air to flow freely therethrough for inflation of said frame;
    an air input structure coupled to said air tube frame for inputting air thereto, said air input structure including a tubular sheet of polyethylene plastic heat sealed to said frame and having a sealing member to prevent escape of air input to said tubing;
    a plurality of substantially transparent walls sealingly connected to said air tube frame so that, when said frame is inflated, said plurality of walls are pulled and supported by said frame into a shape defining an interior chamber;
    a resealable access port for introducing an object into said chamber and removing an object from said chamber; and
    a manual manipulation assembly built into at least one of said plurality of walls to enable a user to handle an object positioned in said chamber without skin contact therewith.

11. The examination unit as set forth in claim 10, wherein said sealing member is a rib-and-channel seal having male and female sealing members that are aligned and joined by pressing both members together while simultaneously sliding along mating surfaces thereof.

12. The examination unit as set forth in claim 10, wherein said sealing member is a plug.

13. The examination unit as set forth in claim 10, wherein said access port comprises a tubular sheet of polyethylene plastic heat sealed to one of said plurality of walls and aligned with a hole therein for accessing said chamber, said access port including a substantially air-tight closing mechanism for sealing said chamber.

14. The examination unit as set forth in claim 10, wherein said manual manipulation assembly includes a pair of sleeved-gloves sealingly connected to at least one of said plurality of walls and extending into said chamber so that an interior of said gloves is isolated from said chamber.

15. The examination unit as set forth in claim 10, wherein said walls and said frame are made of polyethylene plastic having a thickness of approximately 0.006 inches.

16. The examination unit as set forth in claim 10, wherein said tubing includes a plurality of interconnected, generally cylindrical tubes.

17. The examination unit as set forth in claim 16, wherein said shape defining the chamber is generally rectangular.

18. The examination unit as set forth in claim 10, wherein said tubing includes a single generally cylindrical tube bent as necessary to the shape defining the chamber.

19. The examination unit as set forth in claim 18, wherein said shape defining the chamber is generally rectangular.

20. A disposable examination unit comprising:

an air tube frame formed of tubing which allows air to flow freely therethrough for inflation of said frame;

a plurality of walls sealingly connected to said air tube frame so that, when said frame is inflated, said plurality of walls define a generally rectangular enclosure surrounding a fully enclosed interior chamber;

a resealable access port for introducing an object into said chamber and removing an object from said chamber, said access port including a tubular sheet of polyethylene plastic heat sealed to one of said plurality of walls and aligned with a hole therein for accessing said chamber, and a substantially air-tight closing mechanism for sealing said chamber; and a manual manipulation assembly built into at least one of said plurality of walls to enable a user to handle an object positioned in said chamber without skin contact therewith.

21. A disposable examination unit comprising:

an air tube frame formed of a single generally cylindrical tube which allows air to flow freely therethrough for inflation of said frame;

an air input structure coupled to said air tube frame for inputting air thereto;

a plurality of walls sealingly connected to said air tube frame so that, when said frame is inflated, said plurality of walls are pulled and supported by said frame into a shape defining an interior chamber, said generally cylindrical tube being bent as necessary to define said shape;

a resealable access port for introducing an object into said chamber and removing an object from said chamber; and a manual manipulation assembly built into at least one of said plurality of walls to enable a user to handle an object positioned in said chamber without skin contact therewith.

* * * * *